United States Patent [19]

Hatzell

[11] Patent Number: 4,537,261
[45] Date of Patent: Aug. 27, 1985

[54] COMBINED CHISEL PLOW, ROD WEEDER AND DRILL

[76] Inventor: Paul H. Hatzell, 1733 Hwy. 87 East, Billings, Mont. 59101

[21] Appl. No.: 585,240

[22] Filed: Mar. 1, 1984

[51] Int. Cl.³ .................... A01B 39/19; A01B 49/06
[52] U.S. Cl. ........................... 172/44; 172/677; 172/468; 172/483; 280/476 R; 111/52
[58] Field of Search ........... 172/677, 680, 44, 448, 172/464, 449, 451, 483, 468; 111/85, 62, 52; 280/476 R

[56] References Cited

U.S. PATENT DOCUMENTS

| | | | |
|---|---|---|---|
| 3,033,135 | 5/1962 | Gouin | 111/52 |
| 3,039,540 | 6/1962 | Ward | 172/451 |
| 3,661,101 | 5/1972 | Parsons | 172/44 |
| 3,917,003 | 11/1975 | Michels | 172/44 |
| 4,191,262 | 3/1980 | Sylvester | 172/459 |
| 4,195,696 | 4/1980 | Lundin | 172/451 |

Primary Examiner—Richard J. Johnson
Attorney, Agent, or Firm—Harvey B. Jacobson

[57] ABSTRACT

A generally conventional seeder is provided including a main frame supporting a plurality of laterally spaced rear seeder units and equipped with a forwardly projecting tractor attachable hitch assembly including dependingly supported ground wheel structure. The hitch assembly includes mounting frame structure intermediate the main frame and the forward extremity of the hitch assembly and a pair of elongated, generally aligned and axially spaced transversely extending opposite side tool bars are disposed on opposite sides of the ground wheel structure. A pair of laterally spaced upstanding guide and support members project upwardly from adjacent ends of the tool bars and the mounting frame structure includes guide structure from which the guide and support members are guidingly supported for vertical shifting. A cross-head assembly extends between and connects the upper ends of the guide and support members and lift structure is operatively connected between the cross-head assembly and the hitch assembly for adjustably raising and lowering the cross-head assembly relative to the hitch assembly. The mounting frame structure and the remote ends of the tool bars include coacting guide structure guiding the remote ends of the tool bars against rearward displacement relative to the main frame and a plurality of tool shanks are dependingly supported from each of the tool bars. A sweep is mounted from the lower end of each tool shank and shaft journal structure may be supported from each sweep. Driven rod weeder shaft structure may be journaled from and extend between the journal structure rearward of the ground wheel structure.

7 Claims, 8 Drawing Figures

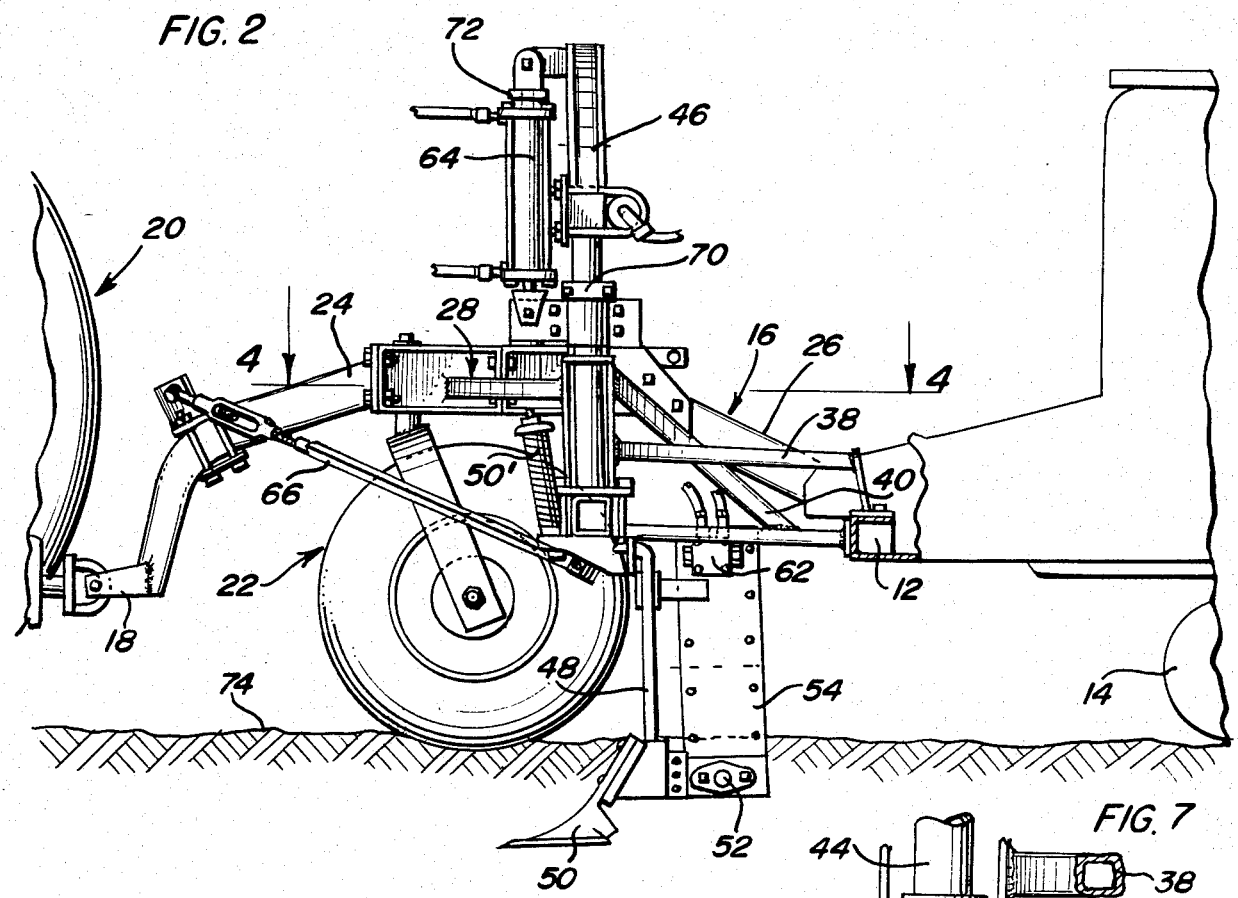
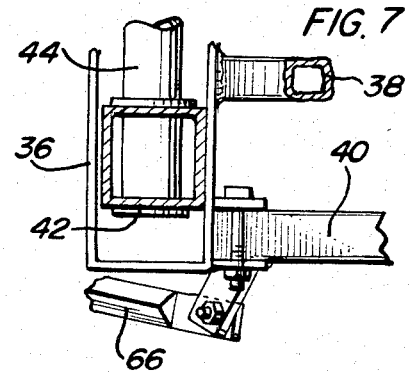
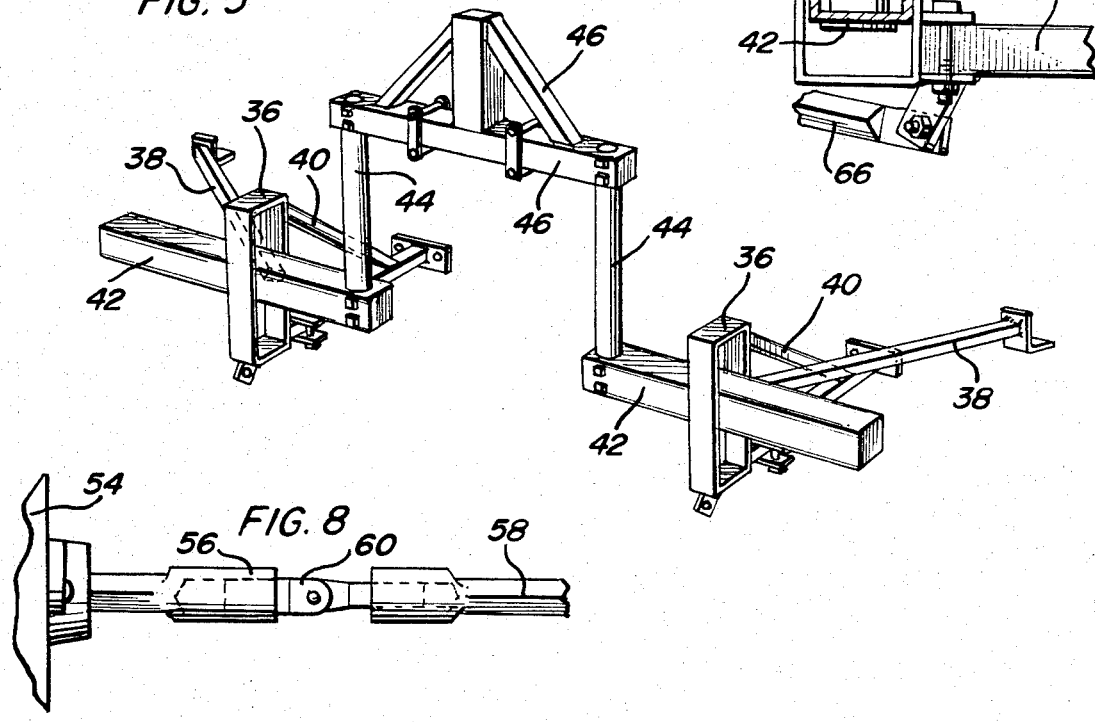

COMBINED CHISEL PLOW, ROD WEEDER AND DRILL

BACKGROUND OF THE INVENTION

Various forms of seeders or drills to be pulled by tractors over ground which has been at least partially prepared for seeding heretofore have been provided. However, much attention has recently been directed toward minimum till seeding operations in the interior of ground moisture retention, fuel conservation, savings in man hours, savings in equipment cost, completion of seeding operation in the shortest possible time due to limited periods of weather favorable to planting and overall economy of a planting operation. Accordingly, some attempts have been made to hook soil preparation and seeding implements in tandem behind a tractor and further attempts have been made to combine seeder and rod weeder implements in a single draft implement.

For various reasons, tandem hooked soil preparation and seeder implements have not proven effective and economical and the few attempts which have been made in combining soil preparation and seeder implements into a single implement have resulted in either one or both of the soil prearation and seeding operations not being carried out as effectively as is possible with separate tractor drawn soil preparation and seeding implements.

Accordingly, a need exists for a seeder or drill to be drawn behind a tractor and equipped with soil preparation implements operative to effectively prepare soil preparatory to seeding and yet which will not interfere with the designed efficient seeding operation of the seeder or drill.

Examples of various different forms of combined soil preparation and seeding implements as well as other implement structures including some of the general structural and operations features of the instant invention are disclosed in U.S. Pat. Nos. 2,743,657, 3,033,135, 3,340,934, 3,430,702, 3,537,532, 3,576,213, 3,661,101 and 4,111,263.

BRIEF DESCRIPTION OF THE INVENTION

The soil preparation and seeding unit of the instant invention incorporates a conventional seeder of the type including a main frame supporting a plurality of laterally spaced rear seeder units and equipped with a forwardly projecting hitch assembly including dependingly supported ground wheel means. Such a seeder is designed to be close coupled behind a tractor for maximum control of seeding depth, even in uneven ground, and the seeder or drill is equipped with a special mounting frame from which a pair of end aligned and axially spaced elongated and transversely extending tool bars are guidingly supported on opposite sides of the ground wheel means for vertical adjustment relative to the hitch assembly.

Each of the tool bars includes a plurality of depending tool shanks from whose lower ends sweeps or other ground working structures are supported and such structures may trailingly support shaft journal members from which driven rod weeder shaft structure may be journaled. The rod weeder shaft structure extends fully between all of the journal members and is spaced slightly rearward of the dependingly supported ground wheel means. Lift structure is operatively connected between the tool bars and the mounting frame for adjustably vertically shifting the tool bars relative to the mounting frame.

The main object of this invention is to provide a combined soil preparation and seeder implement which will be effective in both soil preparation and seeding operations, to a maximum extent.

Another object of this invention is to provide an apparatus in accordance with the immediately preceding object and wherein the soil preparation features thereof include shank supported sweeps or other ground working structures behind which a continuous rod weeder shaft assembly may be journaled.

Yet another object of this invention is to provide a combined soil preparation and seeder implement of the type immediately above set forth and wherein the rod weeder shaft assembly is disposed immediately to the rear of a dependingly supported dirgible ground wheel structure carried by a forwardly projecting hitch assembly of a conventional seeder or drill.

A final object of this invention is to provide a combined soil preparation and seeder implement in accordance with the preceding objects and which will conform to conventional forms of manufacture, be of simple construction and dependable in operation so as to provide a device which will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a side elevational view of the assemblage illustrated in FIG. 1;

FIG. 5 is a fragmentary perspective view of major components of the rod weeder support and guide structure of the instant invention;

FIG. 7 is a fragmentary enlarged vertical sectional view taken substantially upon the section line 7—7 of FIG. 1; and FIG. 8 is a fragmentary elevational view illustrating a sliding universal joint connection used between adjacent rod weeder shaft portions.

DETAILED DESCRIPTION OF THE INVENTION

Figure 1:
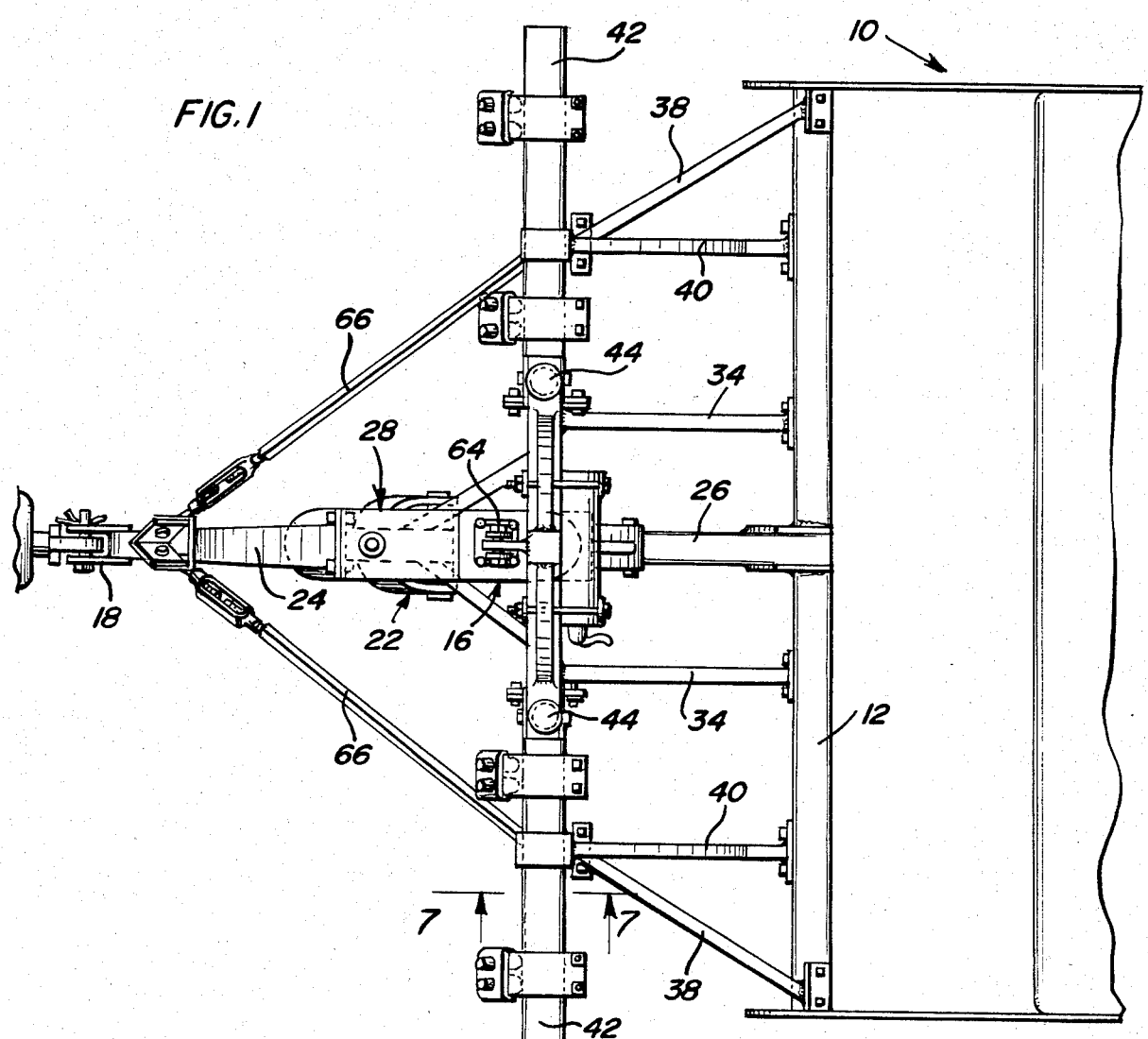
FIG. 1 is a fragmentary top plan view of a combined soil preparation and seeder implement constructed in accordance with the present invention.
Figure 4:
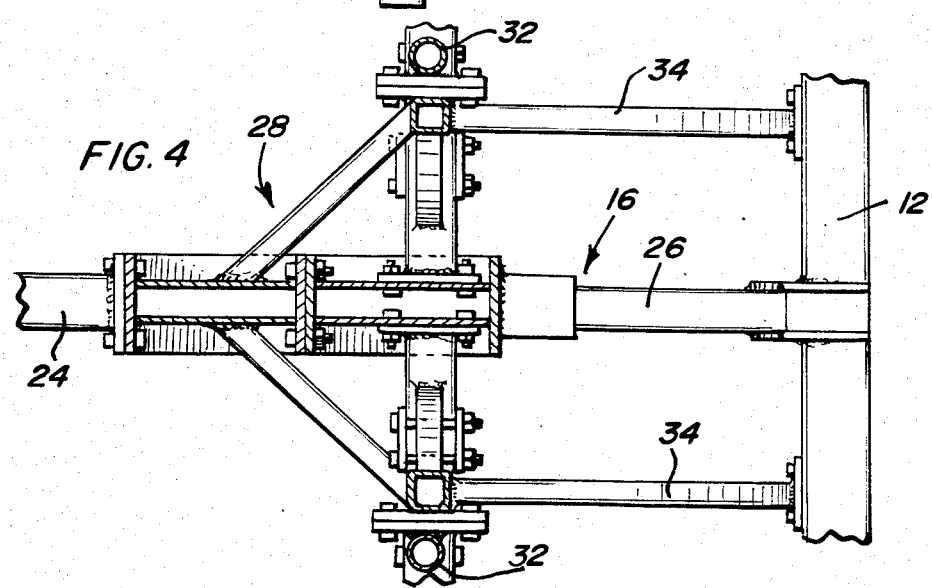
FIG. 4 is a fragmentary horizontal sectional view taken substantially upon the plane indicated by the section line 4—4 of FIG. 2.
Figure 3:
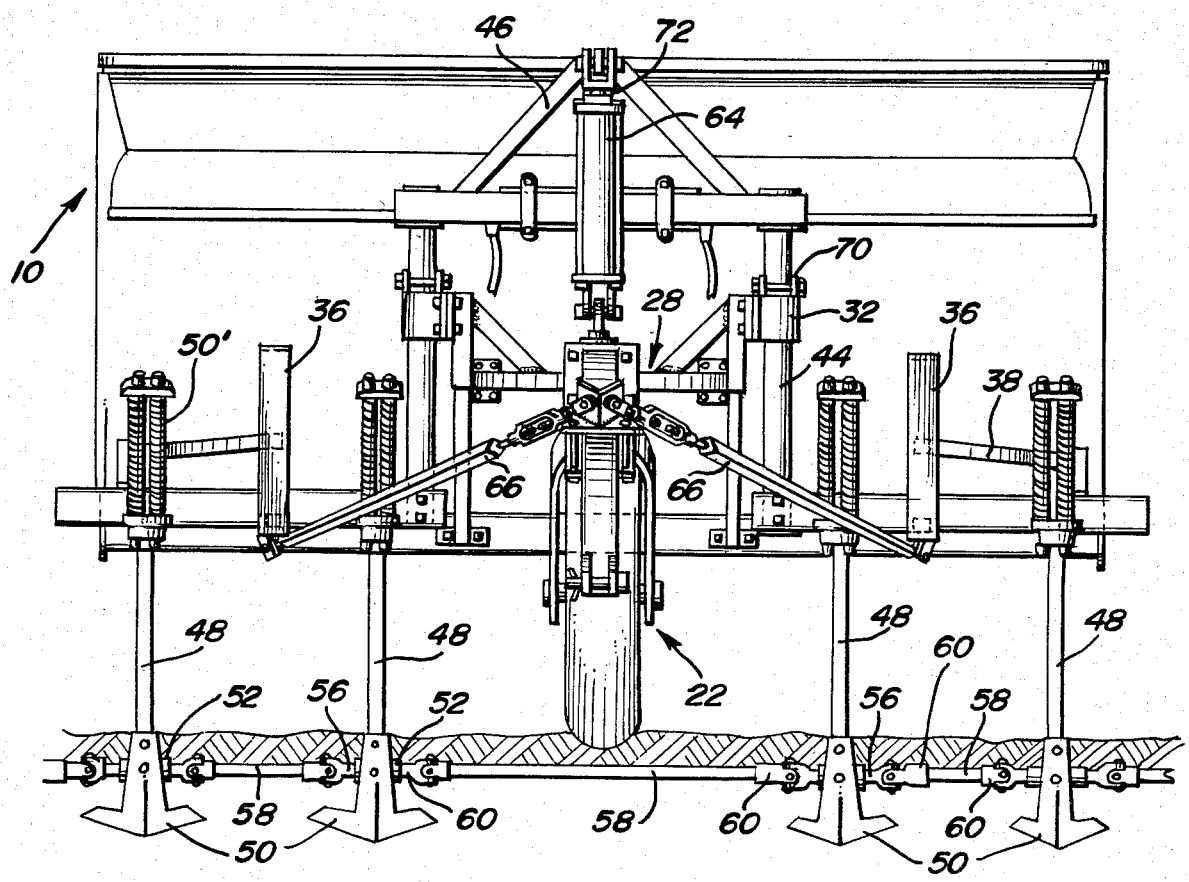
FIG. 3 is a front elevational view of the assembly illustrated in FIGS. 1 and 2.
Figure 6:
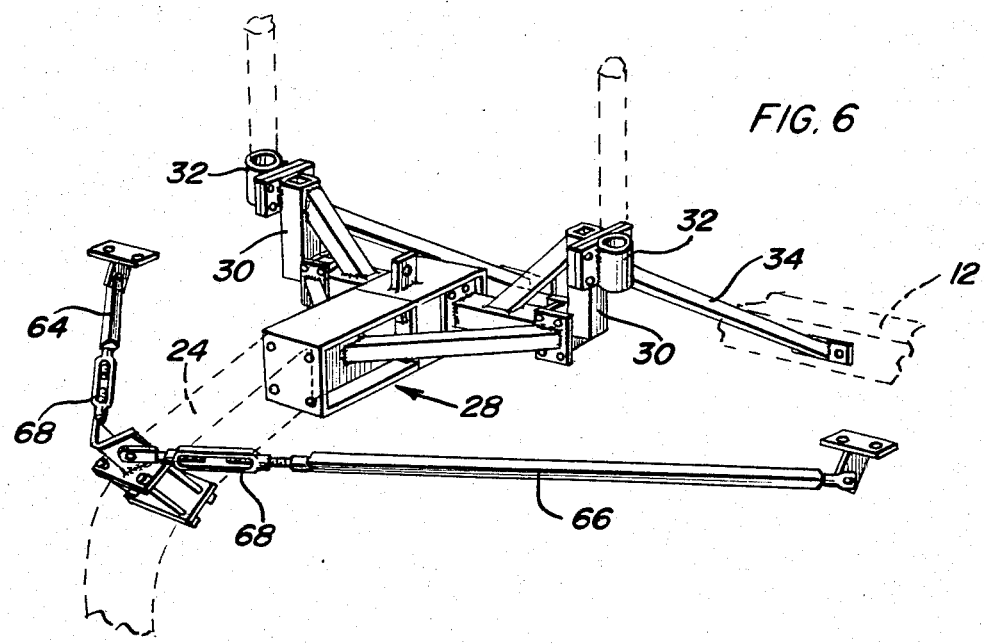
FIG. 6 is a perspective view illustrating additional rod weeders support and guide structure of the instant invention.

Referring now more specifically to the drawings, the numeral 10 generally designates a conventional form of seeder or drill incorporating a main frame 12, a plurality of rear transversely spaced seeder units 14 and a forwardly projecting hitch assembly referred to in general by the reference numeral 16. The hitch assembly 16 includes a forward extremity 18 coupled to the rear of a tractor referred to in general by the reference numeral 20 and the hitch assembly 16 is of the gooseneck type including a dependingly supported ground engaging dirgible wheel assembly referred to in general by the reference numeral 22.

The hitch assembly 16 includes front and rear portions 24 and 26 between which a mounting frame assembly 28 is mounted and the mounting frame assembly includes opposite side portions 30 supporting upstanding guide structures 32 therefrom in the form of vertically disposed sleeves. The mounting frame assembly is braced relative to the main frame 12 as at 34. In addition, the mounting frame assembly further includes opposite side vertically disposed additional guide structures 36 suitably braced relative to the main frame 12 as at 38 and 40.

A pair of horizontal, transversely extending tool bars 42 are disposed in axially spaced end aligned relation and the adjacent ends of the tool bars 42 support upstanding guide members 44 interconnected at their upper ends by a cross-head 46. The guide members 44 are slidingly guidingly received through the guide structures 32 and the remote end portions of the tool bars 42 are guidingly engaged with the additional guide structures 36.

Each of the tool bars 42 includes a pair of depending rearwardly swingable tool support shanks 48 supported therefrom and each of the tool shanks is operatively connected to the corresponding tool bar portion by compression springs 50' which yieldingly resist rearward swinging of the lower ends of the tool shanks 48.

Each tool shank lower end supports a sweep 50 or other earth working tool therefrom and each of the sweeps 50 trailingly supports a rod weeder shaft journal 52 therefrom. One of the shanks 48 supports an upstanding housing 54 therefrom and the corresponding journal 52 is supported from the housing 54. Rod weeder shaft sections 56 are journaled through the journals 52 and rod weeder shaft members 58 extend between and are operatively connected to adjacent rod weeder shaft sections 56 by sliding universal joints 60. The shaft section 56 journaled through the lower end of the housing 54 is driven by a reversible variable speed hydraulic motor 62 and an upstanding hydraulic cylinder 64 is operatively connected between the cross-head 46 and the mounting frame assembly 28. The motor 62 and cylinder 64 are controllably provided hydraulic fluid under pressure from the hydraulic system (not shown) of the tractor 20. Thus, the rod weeder shaft members 58 may be rotated at varying speeds and in opposite directions and upon extension and retraction of the cylinder 64, the tool bars 42 are raised and lowered relative to the mounting frame assembly 28.

The additional guide structures 36 comprise upstanding rectangular frames with which the tool bars 42 are slidingly engaged and the lower forward portions of the frames are braced relative to the forward portion 24 of the hitch assembly 16 by forwardly and upwardly convergent angled bracing members 66 which each incorporate a turnbuckle assembly 68 for adjustment of the length thereof.

The guide members 44 include adjustable stop members 70 mounted thereon engageable with the upper ends of the sleeves 32 to limit downward movement of the guide members 44 and the piston rod portion of the cylinder 64 includes a similar adjustable stop member 72 engageable with the upper end of the cylinder portion of the cylinder 64. Thus, the stop members 70 and 72 may be adjusted for repeated downward adjustment of the sweeps 50 and the rod weeder shaft members 58 to the same depth below the surface of the ground 74 over which the wheel assembly 22 rolls and further enables leveling of the tool bars 42.

The various bracing portions 34, 38, 40 and 66 serve to insure proper bracing of the mounting frame assembly and the guide structures 36 relative to the main frame 12 and the hitch assembly 16. In this manner, the rod weeder attachment may be added to the existing seeder or drill 10 without placing undue stresses thereon.

The rod weeder attachment including the rod weeder shaft members 58 and the sweeps 50 serve to properly prepare the ground 74 immediately forward the seeding units 14 and rearward of the wheel assembly 22. Thus, the rod weeder attachment serves not only to work the ground 74 rearward of the rear wheels of the tractor 20 but also rearward of the wheel assembly 22 so that no wheel tracks remain in the worked ground to be seeded by the seeding units 14. In addition, by mounting the rod weeder attachment on the hitch assembly 16 of the seeder or drill 10 in the manner illustrated and described excessive forward displacement of the wheel assembly 22 is not necessary and the seeder 10 is capable of performing its seeding operation even on uneven ground. Further, by utilizing the vertically disposed tool shank 48, the rod weeder shaft members 58 may be disclosed in very close coupled relation to the wheel assembly 22 which supports the intermediate portion of the hitch assembly 16 from the ground 24. Thus, the sweeps 50 and rod weeder sections 58 are capable of travelling at substantially the same depth, even on uneven ground. Therefore, not only is the designed operation of the seeding units 14 of the drill or seeder 10 retained, but the depth control of the sweeps 50 and rod weeder shaft members 58 is maintained at very close tolerances.

It is also pointed out that the shanks 48 and the sweeps 50 are disposed directly in front of corresponding seeding units 14 whereby the ground 74 is weeded and opened directly in front of the drill openers of the weeding units 14. Further, the attachment comprising the shanks 48, sweeps 50 and rod weeder shaft members 58 may be used independent of the rod weeder shaft members 58, the journals 52 and other supportive components of the rod weeder shaft members 58. In addition, ground working tools other than the sweeps 50 may be supported from the lower ends of the shanks 48. However, whatever ground working implements are used will be positioned in a transverse line disposed immediately rearward of the ground wheel assembly 22 for precise depth control and independent of excessive forward displacement of the wheel assembly 22 which might cause a reduction in the efficiency of the planning operation to be carried out by the seeding units 14. Further, the invention need not include the journals 52 or the rod weeder shaft members 58. In such case, the sweeps, or other ground working implements, mounted from the shanks 48 still will be disposed in close coupled position behind the ground wheel assembly 22. Also, it is to be noted that the instant invention may be used in conjunction with each unit of multiple drill units pulled behind a tractor by a multi implement hitch.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a seeder of the type including a main frame supporting a plurality of laterally spaced rear seeder units and equipped with a forwardly projecting hitch assembly including dependingly supported ground engaging wheel means, said hitch assembly including forward hitch means for coupling to the rear of a tractor and mounting frame means intermediate the hitch means and the rear portion of said hitch assembly, a pair of generally aligned, axially spaced and transversely extending opposite side tool bars disposed on opposite sides of said ground wheel means, a pair of laterally spaced upstanding guide and support members projecting upwardly from adjacent ends of said tool bars, said mounting frame including guide means from which said guide and support members are supported for guided vertical shifting, a cross-head assembly extending between and connecting the upper ends of said guide and support members, lift means operatively connected between said cross-head assembly and said hitch assembly for raising and lowering said cross-head assembly relative to said hitch assembly, said mounting frame means and the remote ends of said tool bars including coacting guide means guiding said remote ends against rearward displacement relative to said main frame, a plurality of tool shanks dependingly supported from each of said tool bars, sweep means mounted from the lower ends of said tool shanks, shaft journal means supported from said sweep means in trailing relation relative thereto, and driven rod weeder shaft means journaled from and extending between said journal means rearward of said wheel means.

2. The seeder of claim 1 wherein said coacting guide means includes guide structures disposed on opposite sides of said ground wheel means and braced relative to corresponding sides of said main frame and the forward portion of said hitch assembly forward of said ground engageable wheel means.

3. The seeder of claim 1 wherein said lift means comprises a vertically disposed hydraulic cylinder.

4. The seeder of claim 1 wherein said lift means includes adjustable stop means for adjustably limiting downward displacement of said cross-head and head and support members relative to said mounting frame means and leveling of the tool bars.

5. In combination with a seeder of the type including a main frame supporting a plurality of laterally spaced rear seeder units and equipped with a forwardly projecting hitch assembly including dependingly supported ground engaging wheel means, said hitch assembly including forward hitch means for coupling to the rear of a tractor and mounting frame means intermediate the hitch means and the rear portion of said hitch assembly, a pair of generally aligned, axially spaced and transversely extending opposite side tool bars disposed on opposite sides of said ground wheel means, a pair of laterally spaced upstanding guide and support members projecting upwardly from adjacent ends of said tool bars, said mounting frame including guide means from which said guide and support members are supported for guided vertical shifting, a cross-head assembly extending between and connecting the upper ends of said guide and support members, lift means operatively connected between said cross-head assembly and said hitch assembly for raising and lowering said cross-head assembly relative to said hitch assembly, said mounting frame means and the remote ends of said tool bars including coacting guide means guiding said remote ends against rearward displacement relative to said main frame, a plurality of tool shanks dependingly supported from each of said tool bars, sweep means mounted from the lower ends of said tool shanks, shaft journal means supported from said sweep means in trailing relation relative thereto, driven rod weeder shaft means journaled from and extending between said jornal means rearward of said wheel means, said rod weeder shaft means including rod weeder shaft sections journaled from each of said shaft journal means and rod weeder shaft members extending between adjacent ends of said rod weeder shaft sections.

6. The seeder of claim 5 wherein the opposite ends of each of said rod weeder shaft members is operatively connected to the adjacent end of the corresponding rod weeder shaft section by a sliding univeral joint.

7. The seeder of claim 6 wherein each of said shanks is supported from the corresponding tool bar for yieldingly resisted rearward and upward swinging of the lower end of each shank.

* * * * *